(12) United States Patent
Kraus (10) Patent No.: US 11,882,793 B2
(45) Date of Patent: Jan. 30, 2024

(54) SYSTEM AND METHOD FOR ESTIMATING OR PREDICTING THE LIFE STATE OF COMPONENTS IN AN AGRICULTURAL BALER

(71) Applicant: Deere & Company, Moline, IL (US)

(72) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 630 days.

(21) Appl. No.: 16/930,930

(22) Filed: Jul. 16, 2020

(65) Prior Publication Data

US 2022/0015298 A1    Jan. 20, 2022

(51) Int. Cl.
| | | |
|---|---|---|
| *A01F 15/04* | (2006.01) | |
| *A01F 15/08* | (2006.01) | |
| *B30B 9/30* | (2006.01) | |
| *G05B 23/02* | (2006.01) | |

(52) U.S. Cl.
CPC ............ *A01F 15/042* (2013.01); *A01F 15/08* (2013.01); *A01F 15/0825* (2013.01); *B30B 9/3007* (2013.01); *G05B 23/0283* (2013.01)

(58) Field of Classification Search
CPC ........ A01F 15/04; A01F 15/042; A01F 15/08; A01F 15/0825; A01F 15/0841; A01F 2015/102; A01B 76/00; B30B 9/3007; G01L 5/0061; G05B 23/0283

See application file for complete search history.

(56) References Cited

U.S. PATENT DOCUMENTS

| | | |
|---|---|---|
| 7,007,599 B2 | 3/2006 | Roth |
| 7,328,625 B2 | 2/2008 | Sundermeyer et al. |
| 8,127,670 B2 | 3/2012 | Vu |

(Continued)

FOREIGN PATENT DOCUMENTS

| | | | | |
|---|---|---|---|---|
| EP | 2502485 A1 | * | 9/2012 | ........... A01F 15/042 |
| EP | 2870858 A1 | | 5/2015 | |
| EP | 3262921 A1 | | 1/2018 | |

OTHER PUBLICATIONS

Extended European Search Report and Written Opinion issued in European Patent Application No. 21184398.2, dated Nov. 17, 2021, in 07 pages.

*Primary Examiner* — Jimmy T Nguyen
(74) *Attorney, Agent, or Firm* — Gary L. Montle; Lucian Wayne Beavers; PattersonIntellectualPropertyLaw, PC (57) ABSTRACT

Systems and methods for estimating remaining life in an agricultural baler comprise a reciprocating plunger for compressing gathered agricultural material into bales. A first sensor generates signals corresponding to force applied to the reciprocating plunger and any baling components configured to at least partially carry forces applied to the plunger. Based on input signals from at least the first sensor, forces associated with a load are recorded and a life state is estimated for the reciprocating plunger and/or at least one associated baler component. An output signal is then generated corresponding to the one or more estimated life states. In an embodiment, an input signal from a second sensor indicates completion of a bale, wherein an amount of life consumed from the plunger and/or baling components is determined in association with the bale, based at least in part on operating conditions of the baled material.

11 Claims, 5 Drawing Sheets

(56) References Cited

U.S. PATENT DOCUMENTS

| | | |
|---|---|---|
| 9,277,692 B2 | 3/2016 | Roth |
| 9,719,899 B2* | 8/2017 | Vandamme ............. A01F 15/08 |
| 9,736,988 B2 | 8/2017 | Lang et al. |
| 10,276,015 B2 | 4/2019 | Lang et al. |
| 10,588,268 B2 | 3/2020 | Lang |
| 2015/0257340 A1* | 9/2015 | Anstey ................ A01F 15/0883 56/341 |
| 2017/0367268 A1* | 12/2017 | Lang .................... B30B 9/3007 |

* cited by examiner

SYSTEM AND METHOD FOR ESTIMATING OR PREDICTING THE LIFE STATE OF COMPONENTS IN AN AGRICULTURAL BALER

FIELD OF THE DISCLOSURE

The present disclosure relates generally to agricultural balers such as large square balers, and more particularly to systems and methods for predicting a remaining life in operational components of such balers.

BACKGROUND

Agricultural balers have been used for many years for harvesting crops such as hay. A primary advantage of large square balers over other types of balers (such as round balers for example) is that they densify the crop into large rectangular shaped bales that minimizes both shipping and storage costs.

One problem in the conventionally designed agricultural balers is with respect to customers that are purchasing a used baler, wherein there is no way to know how the baler was used and thus how much life is remaining in the baler components.

Another problem in the conventionally designed agriculturally balers is with respect to farmers that own a baler, wherein there is currently no way for them to know how much damage/life they are consuming from the baler when they are baling different crops or bales at different densities.

Therefore, what is needed is a system that can measure loads applied to major components (and/or units or systems) of the baler and predict how much life/value has been consumed from the baler based on how the baler is being used.

BRIEF SUMMARY

The current disclosure provides an enhancement to conventional systems, at least in part by introducing a novel agricultural baler and associated methods for utilizing information regarding loads applied to, e.g., the plunger to estimate and/or predict how much damage has accrued or how much life has been consumed on the context of baler performance such as for example in the formation of a bale.

In one embodiment, the baler generally comprises a baling chamber, a reciprocating plunger for compressing gathered agricultural material into bales within the baling chamber, the reciprocating plunger being driven by a crank arm itself being rotated around a crank arm axis by a crank gear, and at least a first sensor configured to generate signals relating to force applied to the reciprocating plunger and one or more baling components configured to at least partially carry forces applied to the plunger. An input signal from the first sensor may be received, for example by a controller further configured to record forces associated with a load, and to estimate a life state for one or more of the reciprocating plunger and the baling component configured to at least carry forces applied to the reciprocating plunger. At least one output signal may subsequently be generated relating to the one or more estimated life states.

In one exemplary aspect of the above-referenced embodiment, one or more additional sensors may further generate signals relating to a count of crank arm revolutions (or cycles), wherein the controller further implements the count for determining life consumed by a given load.

In another exemplary aspect of the above-referenced embodiment, the controller may further receive an input signal from a second sensor indicating completion of a bale of said agricultural material, and responsive to completion of the bale, further determine an amount of life consumed from the plunger and/or one or more baling components in association with the bale, based at least in part on one or more operating conditions of the agricultural material being baled.

In another exemplary aspect, the controller may automatically determine at least one of the one or more operating conditions associated with the agricultural material being baled, based at least in part on one or more detected operating parameters of the baler.

In another exemplary aspect, the controller may automatically determine at least one of the one or more operating conditions associated with the agricultural material being baled, based at least in part on a detected geolocation of the baler.

In another exemplary aspect, the one or more operating conditions associated with the agricultural material being baled may comprise one or more of: a type of agricultural material; a target bale density; and a moisture content.

In another exemplary aspect of the above-referenced embodiment, the one or more estimated life states may comprise one or more of: life consumed; life remaining; and life consumed per bale.

In another exemplary aspect of the above-referenced embodiment, the one or more estimated life states may comprise a comparison of life consumed per bale for each of a plurality of different operating conditions.

In another exemplary aspect of the above-referenced embodiment, the one or more estimated life states may comprise a predicted life remaining for each of a plurality of selectable parameters corresponding to each of one or more operating conditions of the agricultural material being baled.

For example, the controller may be further configured to selectively generate an output signal corresponding to a maintenance schedule or intervention request, based on the predicted life remaining for at least one of the plurality of selectable parameters.

In another exemplary aspect of the above-referenced embodiment, the one or more estimated life states may comprise a life remaining as defined via one or more of: a number of bales; a baling time; and a volume of material baled.

In another exemplary aspect of the above-referenced embodiment, a graphical user interface may be linked to the controller and configured to receive user input of at least one of the one or more operating conditions. The graphical user interface may further receive the output signal from the controller and programmatically generate display indicia on a display unit thereof, corresponding to the life state of at least one of the plunger and/or one or more baling components.

In another exemplary aspect of the above-referenced embodiment, the controller may be physically mounted in or to the drawn agricultural baler.

Alternatively, the controller may be external to the drawn agricultural baler and functionally linked to the first sensor via at least a wireless communications network.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-5, various embodiments of an agricultural baler, associated systems, and methods of operation may now be described. Generally stated, the following embodiments may utilize measurements of, e.g., loads applied to the plunger of an agricultural baler in a novel manner to predict and/or estimate how much damage has accrued or how much life has been consumed in the context of baler performance such as for example by forming a particular bale of agricultural product.

Various embodiments of an agricultural baler as disclosed herein utilize a relatively simple compression system comprised of a gearbox with a crank arm and connector link which is attached to a plunger. During each rotation of the crank arm, crop is placed in front of the plunger. The plunger compresses the crop by extruding the crop though a rectangular chute as the plunger moves forward. The sides and top of the rectangular chute are generally movable so the size of the chute can be varied. If the size of the chute is reduced, the amount of pressure (or force) applied to the crop increases which thereby increases bale density. Likewise, if the size of the chute is increased, the pressure applied to the crop (and thus the force applied to the plunger) decreases, which decreases bale density. Most balers are equipped with a control system that regulates the bale density by measuring the force applied to the plunger and regulating the position or force applied to the side walls of the baler chute. These control systems are designed to maintain a constant bale density by maintaining a constant plunger force.

The force needed to form a bale to a specific density may generally be dependent on the crop type and the rheological properties of the crop. For example, much more force is typically applied to the plunger when baling straw to form a bale having a specific weight than is required for alfalfa or grass types crops. Consequently, the main drive components and other structural members of balers that are predominantly used to bale straw wear out or fail sooner than balers that are used predominantly to bale alfalfa. Moreover, operators can adjust or preset the density of the bale. Balers that have been set at the maximum density during the majority of their use wear out or fail sooner than balers that were operated at relatively lower densities.

As is conventionally known in the art, a controller can be configured to detect and calculate the amount of work exerted by the plunger as it reciprocates within the baling chamber, and further to generally calculate the work exerted by the plunger by determining the force applied to the plunger and the distance the plunger has traveled with respect to the baling chamber.

Various embodiments as further disclosed herein are provided to supplement traditional techniques wherein the measured loads applied to the plunger are used in a feedback loop to regulate the force applied to the tension panels (and/or the position of the tension panels) to maintain a constant bale density, by further utilizing this force data not only to regulate the tension panels to maintain a constant bale density, but also to estimate and/or predict how much life has been consumed from the baler or specific components that carry the loads applied to the plunger.

The term "components" as described herein for carrying loads applied to the plunger of an agricultural baler may for example include, without limitation, the main gearbox, main driveline components, plunger bearings, plunger structure, plunger connecting rods, plunger load pins, tension panels, main frame structure, and the like as would be appreciated by one of skill in the art.

The terms "right" and "left" as used herein are in accordance with an observer standing behind and facing in a forward direction of travel of an agricultural baler constructed as disclosed herein.

Figure 1:
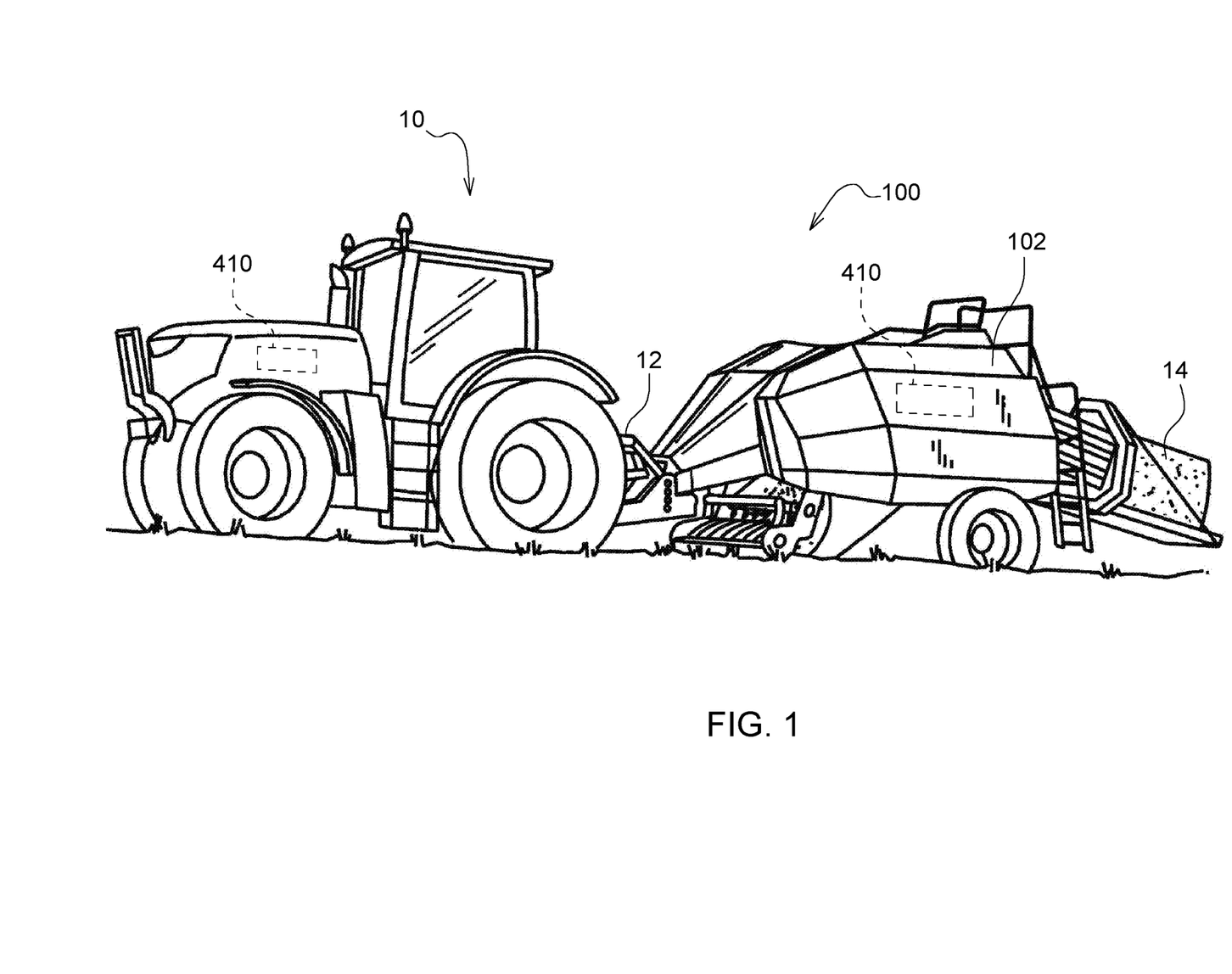
FIG. 1 is a perspective view of a vehicle drawing an agricultural baler as disclosed herein.

FIG. 1 is a perspective view of an exemplary agricultural baler 100, specifically in the present embodiment a large square baler. The large square baler 100 may be towed across a field by an agricultural vehicle 10, although one of skill in the art may readily appreciate various other configurations are also possible. The baler 100 may include a housing 102, which may generally shield various internal components of the baler 100. As the baler 100 moves across a field (e.g., as towed by the vehicle 10 via connection 12) and encounters an arrangement of material, a working unit (e.g., pick-up assembly) 104 may gather the material and move it up and into the housing 102 for processing. As a result of this processing, as described in greater detail below, bale(s) 14 may be formed and subsequently ejected from the rear of the baler 100.

In various embodiments, the baler 100 (or vehicle 10) may include one or more computing devices, such as a controller 410. Various alternative locations for the controller 410 are depicted in FIG. 1, including locations on the vehicle 10 and the baler 100. It will be understood that one or more controllers may be employed and that the controller may be mounted at various locations on the vehicle 10, baler 100, or elsewhere. The controller may as further noted below be a hardware, software, or hardware and software computing device, and may be configured to execute various computational and control functionality with respect to the baler 100 (or vehicle 10). As such, the controller may be in electronic or other communication with various components and devices of the baler 100 (or vehicle 10). For example, a controller within the baler 100 may be in electronic communication with various actuators, sensors, and other devices within (or outside of) the baler 100.

Figure 2:
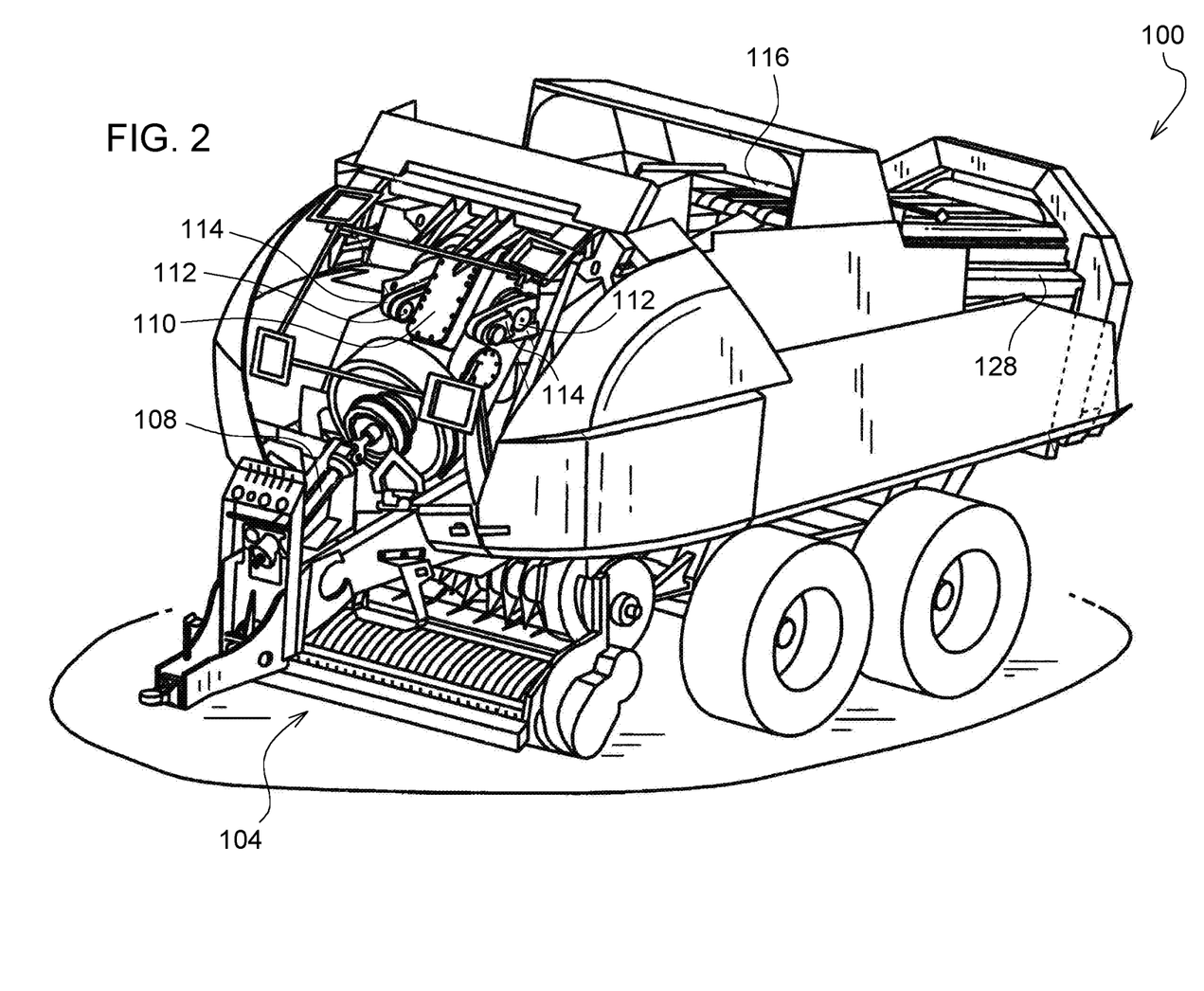
FIG. 2 is a perspective view of an embodiment of the agricultural baler as represented in FIG. 1.

Referring now to FIG. 2, various internal components of an exemplary configuration of the baler 100 are depicted, although one of skill in the art may appreciate that various other configurations may also be possible. The working unit 104, for example, may include a rotary tine pick-up for engaging crop material 126 as the baler moves in a forward direction across the ground surface. The material gathered by the rotary tine pick-up may be routed to a feed auger, which may further direct the material toward a baling chamber 116 for compaction into a bale.

The baling chamber 116, which is depicted with an upper panel in place, may be a chamber of generally rectangular cross section extending axially along the baler 100 in a generally front-to-back direction. The chamber 116 may be configured in various ways to receive material gathered by the working unit 104, hold the material for compaction, then release the resulting bale 14 from the back (or other portion) of the baler 100.

The baling chamber 116 may be bounded on one or more sides (e.g., to the right and left, from the perspective of the forward direction of the baler 100) by tension panels 128, which may be movable in order to control various aspects of a baling operation. For example, various actuators (not shown) may be mounted to the baler 100 and one or more of the tension panels 128 such that the actuators may cause the tension panels 128 to vary the cross-sectional area of the baling chamber 116. In certain embodiments, for example, hydraulic pistons (not shown) may be configured to pivot the tension panels 128 into (or out of) the baling chamber 116, in order to decrease (or increase) the cross-sectional area of the chamber 116 and thereby increase (or decrease) the force required to push a given amount of compacted crop material 126 through the chamber 116 (e.g., the pressure required for the plunger 130 (see FIG. 3) to move the bale through the chamber 116). In this way, for example, the tension panels 128 may be utilized to vary the density of the resulting bale 14.

Figure 3:
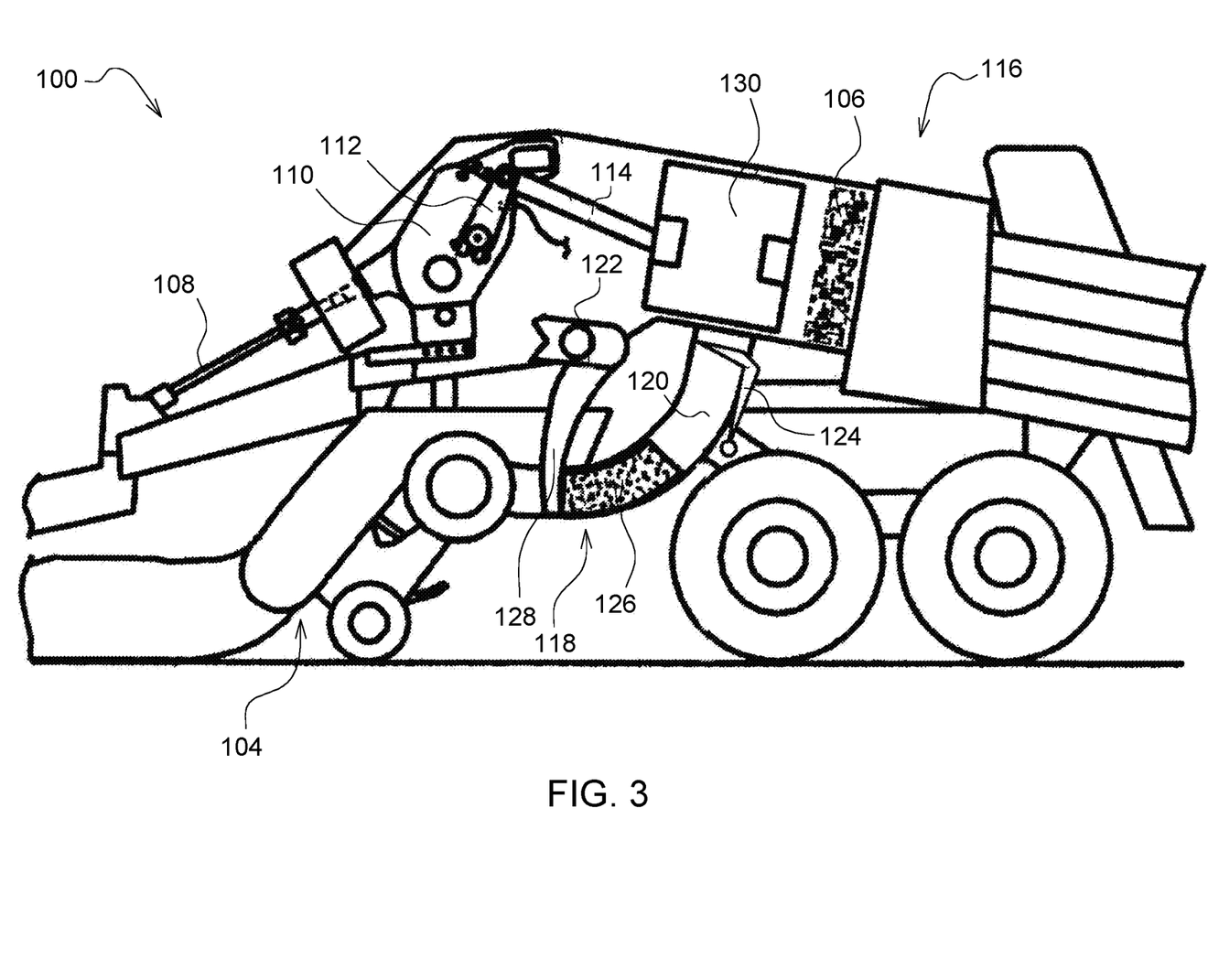
FIG. 3 is a side elevation view of the embodiment of the agricultural baler as represented in FIG. 1.

Compaction of crop material within the baling chamber 116 may be driven in various ways. For example, as depicted in the various figures, a plunger 130 (not shown in FIG. 2) may be driven by a crank arm assembly. As depicted in FIG. 2, a power take off ("PTO") connection shaft 108 may be configured to receive rotational power from a PTO shaft of the vehicle 10 (e.g., via connection 12, as shown in FIG. 1). In certain embodiments, accordingly, whenever the PTO output of the vehicle 10 is engaged, the PTO connection shaft 108 may be receiving rotational power from the vehicle 10. One of skill in the art may appreciate that various other configurations are also possible, such as configurations in which the shaft 108 (or various other components of the baler 100) may be selectively disengaged even if the PTO output of the vehicle 10 is engaged.

In various embodiments, the PTO connection shaft 108 may provide rotational power to a gear box 110. Through one or more internal gears (not shown in FIG. 2), this power may be routed through the gear box 110 to crank arms 112, which may be connected to the plunger 130 via connecting rods 114 (partially removed in FIG. 2, for clarity of presentation). In this way, rotational power may be provided from the vehicle 10 to the crank arms 112. The crank arms 112, accordingly, may then drive the reciprocating motion of the plunger 130, via connecting rods 114, in order to compact material within the baling chamber 116 into formed bales 14. One of skill in the art may appreciate that various other configurations may be possible. For example, in certain embodiments, the gear box 110 may be powered by an electrical or hydraulic machine rather than by direct mechanical power from a PTO interface.

In various embodiments, rotation of the PTO connection shaft 108 (e.g., as powered by the PTO output of the vehicle 10) may additionally (or alternatively) provide rotational power to various components of the baler 100. For example, the motion of various components of the working unit 104, various tying mechanisms (not shown), pumps for hydraulic actuation of tension panels (not shown), and so on, may be driven via power connections of various known types (e.g., chain or belt drives) to the PTO connection shaft 108 or associated components.

Further by reference to FIG. 3, an exemplary movement of material through the baler 100 is depicted, from a windrow to a formed bale 106. Crop (or other) material 126 may be gathered from the windrow by the working unit 104 (e.g., picked up by the rotary tine pick-up) and routed by the assembly 104 (e.g., by a feed auger) into a feeder duct 118. Depending on the configuration of the windrow, such gathering and routing may be relatively continuous as the baler 100 moves along the windrow. Crop (or other) material 126 within the feeder duct 118 may be moved by various mechanisms (e.g., feeder forks 128 or a separate packer assembly (not shown)) along the feeder duct 118 towards the baling chamber 116. In certain embodiments, the material 126 may not be fed continuously into the baling chamber 116, but may be held within a pre-charge chamber 120 of the feeder duct 118 by a retaining assembly 124 (e.g., one or more retaining tines (not shown)). As feeder forks 128 (or components of a different packer assembly) continue to move material along the feeder duct 118, and the material continues to be prevented from entering the baling chamber 116 (e.g., by the retaining assembly 124), the material may begin to form an elongated "flake" within the pre-charge chamber 120.

One of skill in the art may appreciate that various alternative configurations may be possible. For example, although feeder forks 128 may be depicted as moving crop material 126 both along the feeder duct 118 and into the baling chamber 116, two or more separate mechanisms may address these respective material movements. For example, a packer assembly (not shown) may transport the material 126 along the feeder duct 118 and a separate feeder assembly (not shown) may transport flake from the pre-charge chamber 120 into the baling chamber 116. In certain embodiments, flake may be formed elsewhere than in the pre-charge chamber 120 or may be fed into the baling chamber 116 from the side of the baling chamber 116, rather than the bottom. Further, in various embodiments, various components of the baler 100 may be mechanically, electrically, hydraulically or otherwise actuated. In this light, it may be understood that the timing of the operation of the various components may be controlled mechanically (e.g., via various geared or other relationships), or one or more sensors (not shown) or controllers (e.g., controllers 410) may be included to measure or coordinate movement of various components.

Figure 4:
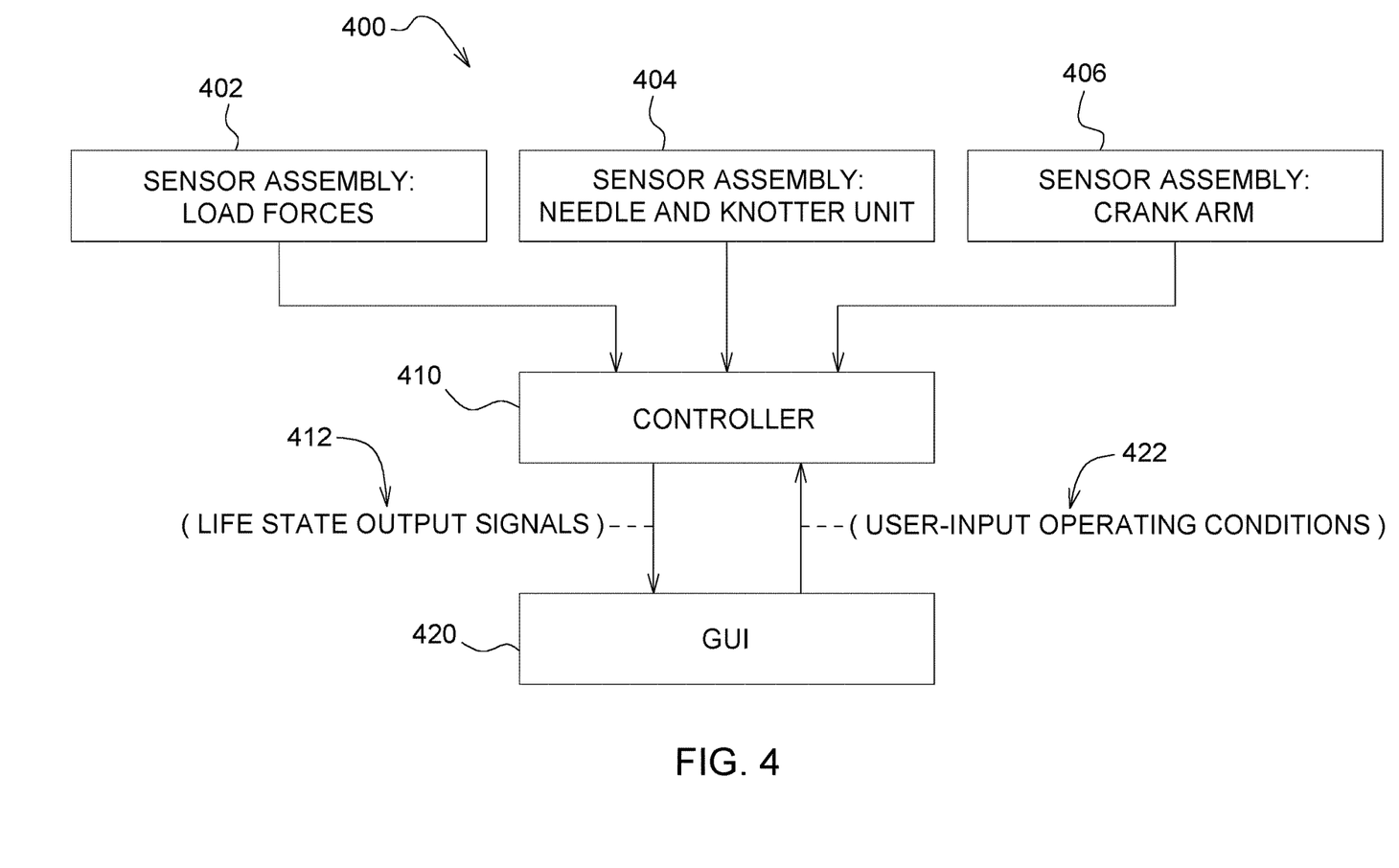
FIG. 4 is a block diagram representing an exemplary life estimation and/or prediction system for an agricultural baler as disclosed herein.

Referring now to FIG. 4, an embodiment of a life estimation and/or prediction system 400 may now be described, for illustrative purposes with respect to the embodiment of an agricultural baler as provided above with respect to FIGS. 1-3, but without being limited in scope thereto unless expressly stated otherwise. Generally stated, the data from, e.g., load pins mounted in the plunger may be used to control the force applied to the tension panels 128 via hydraulic piston-cylinder units and as further regulated by a control valve. Control logic may be designed to maintain a constant plunger force. Therefore, if the plunger force decreases, the controller 410 may command the control valve to pump more oil to the hydraulic cylinders thereby causing the tension panels to move inward toward the center of the baler 100. This inward movement increases the amount of friction on the sides of the bale, causing the force to move the bale through the bale chamber to increase, and thus increasing the plunger load. If the plunger load increases above a desired set point, the system 400 operates in the opposite fashion.

The system 400 includes one or more sensor assemblies configured to provide requisite input data to a controller 410. The controller 410 may generally be configured to automatically and/or user-selectively perform life estimation and/or prediction operations, examples of which are more particularly described below with respect to method 500. Various operations, steps or algorithms as described in connection with the controller can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

A first sensor assembly 402 functionally linked to the controller 410 may include one or more sensors configured to provide signals relating to load forces on the plunger 130 and/or one or more additional components at least partially carrying forces on the plunger 130. For example, a load cell mounted in the plunger may be implemented to generate appropriate load data for the controller 410, and/or a sensor may be mounted to the linkage of the plunger and configured to measure the total amount of force being applied to the compression surface as the plunger travels along its stroke path, and/or a plate force sensor may be mounted to the compression surface of the plunger, or various alternative force measuring sensors as are known in the art.

In an alternative embodiment, the controller 410 may determine load data from a first sensor assembly 402 configured in association with machine operating parameters of the vehicle 10 drawing the baler 100, rather than from the first sensor assembly 402 associated with the plunger 130. As one example, the controller may be capable of estimating the forces based on sensed power on the tractor drive line.

As used herein, where signals are described as "corresponding to" or "relating to" a recited characteristic such as, e.g., a force or velocity, such signals may be produced in accordance with direct measurements of the characteristic, or may otherwise be produced in accordance with one or more alternative sources and indirectly reflect, or provide a basis for deriving or calculating, current values or states of the characteristic.

A second sensor assembly 404 functionally linked to the controller 410 may include one or more sensors configured to provide signals relating to completion of a bale of the crop 126 or other agricultural product. For example, once a bale 14 has been formed, it may be tied in order to assist the bale 14 in retaining its shape once it has been ejected from the baling chamber 116. As such, various tying mechanisms (not shown) may be included for looping, wrapping, and tying twine or other material around the bale 14. For example, various tying needles, knotter assemblies, and so on (not shown) may be included. As noted above, these mechanisms and their components may be actuated and controlled in various ways.

A third sensor assembly 406 functionally linked to the controller 410 may include one or more sensors configured to provide signals relating to a position of the plunger 130, for example via monitoring of a crank arm 112. Having such a sensor assembly may for example allow the number of plunger loads per bale to be recorded. In one example of an embodiment utilizing the third sensor assembly, it is noted that the gear box 110 may receive rotational power at an input shaft. Through internal gearing of various configurations (e.g., for reduction of rotational speed from the shaft 108 to ensure appropriately timed movement of the plunger 130), this input power may drive the rotation of a bull gear. The bull gear may in turn drive the rotation of the crank arms 112 around a crank arm axis. For example, the crank arms 112 may be secured by a splined connection to stub shafts extending from the bull gear out of the gear box 110. In this way, for example, rotational power from the PTO connection shaft 108 (or another source) may be utilized to drive rotation of the crank arms 112 and, thereby, the reciprocating motion of the plunger 130. A third sensor assembly 406 may accordingly be mounted to the housing of the gear box 110 (or otherwise fixed with respect to various components of the baler 100). For example, a crank arm sensor may be mounted to a mounting bracket (or another feature) on a cover of the gear box 110. The crank arm sensor may be an optical sensor, a Hall effect or other magnetic sensor, or a sensor of various other known configurations. The crank arm sensor may be located in relatively close proximity to the crank arm 112, such that the sensor may sense the passage of the crank arm 112 past the sensor as the crank arm 112 rotates around its axis. For example, the crank arm sensor may be configured to provide a voltage signal that is higher when there is metal material present in the sensing location, and lower when no metal material is present in the sensing location. In this way, for example, a sensor may be configured to provide a voltage signal to the controller 410 that will be high when a portion of the crank arm 112 is in location, but low when the crank arm 112 is elsewhere. The controller 410 may accordingly be configured to identify the passage of the leading (or trailing) edge of the crank arm 112 as it passes through location by identifying the leading (or trailing) edge of the associated voltage spikes in the signal from the sensor. The controller 410 may accordingly determine, with relatively high precision, the location of the crank arm 112 along at least one point in the crank arm's revolution around its axis. A sensor may for example be mounted to the cover of the gear box 110 (or other feature of the baler 100) such that this determined location may correspond with the home position of the plunger 130. One of skill in the art may appreciate, however, that other configurations may also be possible, including configurations in which the sensor senses the crank arm 112 when the plunger 130 is at a different location.

The controller 410 may also be functionally linked to at least one user interface 420. The term "user interface" as used herein may broadly take the form of a display unit providing text, images, etc., and/or other outputs from the system such as indicator lights, audible alerts, and the like. The user interface may further or alternatively include various controls or user inputs (e.g., a steering wheel, joysticks, levers, buttons) for operating a baler 100 or associated vehicle. Such an onboard user interface may be coupled to a control system via for example a CAN bus arrangement or other equivalent forms of electrical and/or electro-mechanical signal transmission. Another form of user interface (not shown) may take the form of a display that is generated on a remote (i.e., not onboard) computing device, which may display outputs such as status indications and/or otherwise enable user interaction such as the providing of inputs to the system. In the context of a remote user interface, data transmission between, for example, a vehicle control system and the user interface may take the form of a wireless communications system and one or more associated components as are conventionally known in the art.

The user interface 420 may be configured to receive life state output signals 412 from the controller 410 and further display or otherwise implement such signals in the form of audio, visual, or audio-visual indicia for user review, analysis, alerting, and the like.

The user interface 420 may further be configured to enable the manual entry and transmittal of one or more operating conditions 422 to the controller, as may for example be implemented in certain algorithms for estimating and/or predicting of component life states. Exemplary operating conditions may include variables corresponding to a particular crop type, a desired bale density, a crop moisture, and other which may be relevant to the determination of life states. For example, as previously noted the force needed to form a bale to a specific density may generally be dependent on the crop type and the rheological properties of the crop, wherein more force must be applied to the plunger when baling straw to form a bale having a specific weight than is required for alfalfa or grass types crops. Algorithms as disclosed herein may distinguish the main drive components and other structural members of balers that have been (or will be) predominantly used to bale straw from balers that have been (or will be) used predominantly to bale alfalfa, and/or may programmatically account for the operation of balers at a relatively high bale density during the majority of their use, in contrast to balers that have been (or will be) operated at relatively lower densities In various embodiments, operating condition information may be directly provided by users via the user interface 420, and/or may be determined by the controller 410 for example in response to detected baler performance parameters that are monitored by the controller and/or one or more other devices.

Figure 5:
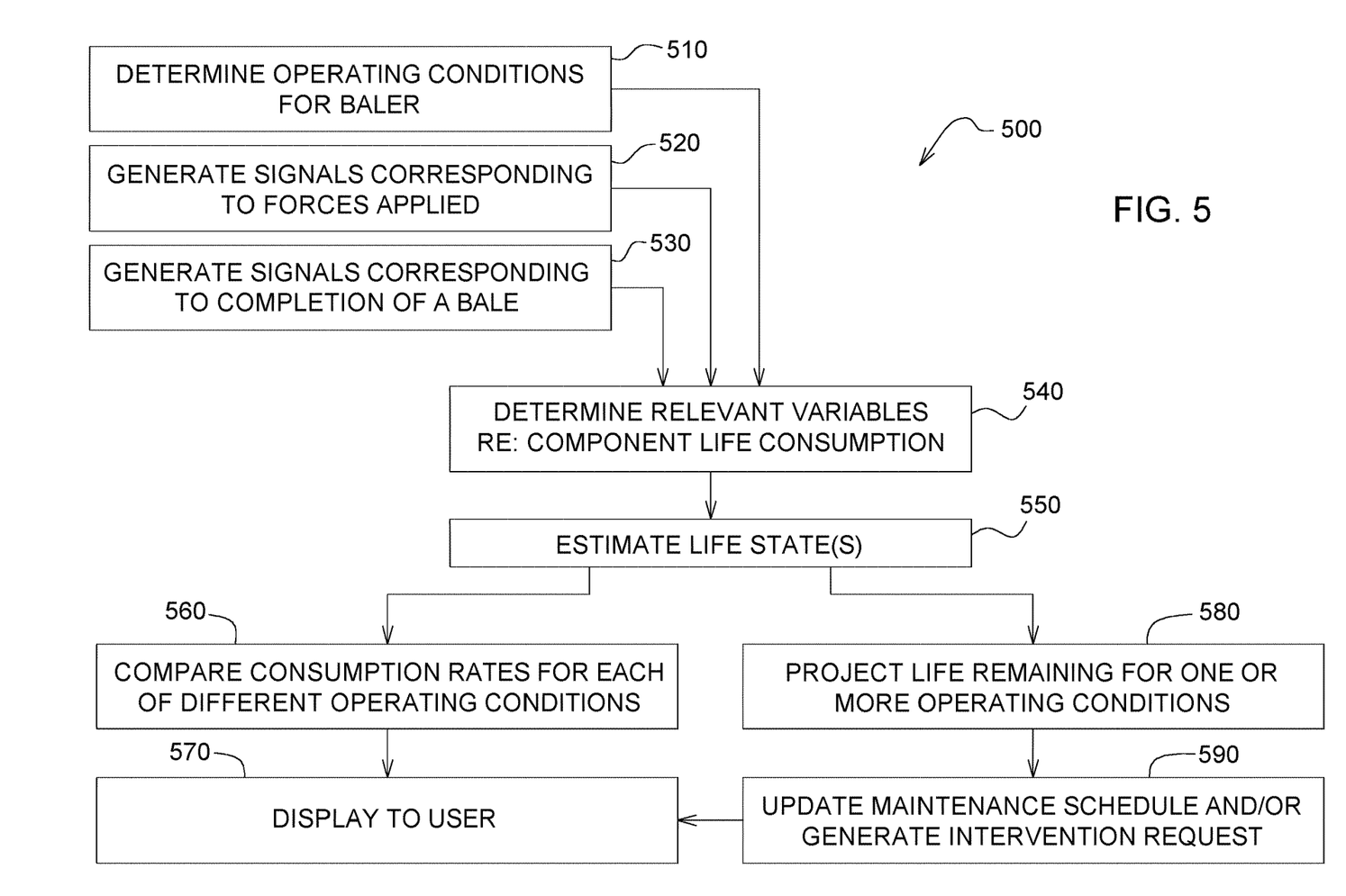
FIG. 5 is a flowchart representing an exemplary method for estimating and/or predicting a remaining life in operational components of agricultural balers as disclosed herein.

Referring now to FIG. 5, an exemplary method 500 may be described by further illustrative reference to the system 400 in FIG. 4, without being limited in scope thereto unless otherwise expressly stated.

The method 500 may include a step 510 of determining of one or more operating conditions for the baler 100, and further processing of the determined operating conditions (step 540) at the controller 410 in the context of determining relevant variables with respect to component life consumption. As previously noted, a graphical user interface functionally linked to the controller may be configured to receive user input for at least one of the one or more operating conditions.

Additionally or in the alternative, one or more of the operating conditions associated with the agricultural material being baled may be automatically determined based at least in part on one or more detected operating parameters of the baler 100 and/or of a vehicle 10 (e.g., tractor) drawing the baler.

Still further additionally or in the alternative, the controller may be configured to automatically determine at least one of the one or more operating conditions associated with the agricultural material being baled, based at least in part on a detected geolocation of the baler 100. For example, a detected geolocation may be stored in association with retrievable information corresponding to a crop type, or a moisture level may be inferred from recent weather or other equivalent data associated with the detected geolocation. The geolocation may be determined using, e.g., a global positioning system transceiver associated with the baler and/or to a vehicle drawing the baler, and/or a mobile computing device carried by a user of the vehicle, etc.

The method 500 may further include a step 520 of generating signals corresponding to load forces on the plunger 130 and/or one or more associated drive components, as noted above with respect to sensor assembly 402, and further processing of said signals (step 540) at the controller 410 for determining the load forces on the respective baler components. In an embodiment, such a step may be triggered upon activation of the baler 100 and then be performed substantially continuously by monitoring of load data from one or more plunger load pins, wherein the input load data may be stored in data storage medium associated with the controller, such as for example in a database, as part of the controller or otherwise discrete but functionally linked thereto. In an embodiment, additional information may be collected regarding a count of crank arm revolutions (or cycles).

The method 500 may further include a step 530 of generating signals corresponding to completion of a bale, as noted above with respect to sensor assembly 404, and further processing of said signals (step 540) at the controller 410, e.g., as may be implemented for determining the life consumption on respective baler components based on the identified bale, the determined load forces, and/or one or more associated operating conditions.

For example, when a full bale is reached a knotter system may be activated to tie off a bale. Upon activation of the knotter system, the needle sensor sends a signal to the controller indicating that the knotter has been activated. This effectively informs the controller that all the load data that has been stored subsequent to a previously received signal from the needle sensor pertains to that bale, and the controller may associate such load data to that respective bale, such as by recording an average or aggregate amount of force alongside a bale count.

Life consumption may be determined by the controller 410 in numerous exemplary contexts according to embodiments as disclosed herein. For example, the controller may be configured to compile all the received load data and calculate the amount of life that has been consumed from key baler components (using, e.g., standardized life calculations) to form that bale. Such calculations may be performed continuously or periodically, such as for example upon the completion of each bale. In an embodiment, the controller may calculate an amount of work exerted by the plunger during a single reciprocating movement of the plunger 130 during the baling process (i.e., the plunger moving from a retracted position to an extended position and returning back to the initial retracted position, or alternatively during one or more rotations of the output shaft of the gearbox. As the plunger 130 moves along its path, the controller receives a stream of information in the form of signals from the one or more sensor assemblies 402, 404, 406 positioned throughout the baler 100, and then compiles the raw information received from the sensors and processes it using one or more algorithms to calculate the total work exerted by the baler over the duration of, e.g., a particular bale or a number of rotations of the output shaft of the gearbox.

The illustrated method 500 further includes a step 550 of determining (estimating and/or predicting) a life state for each of one or more baler components which may for example include the plunger 130 and/or one or more associated drive components. The one or more estimated component-specific life states may for example comprise an aggregate amount of life consumed, an estimated amount of life remaining, an amount of life consumed per bale, and the like. In various embodiments, the life state parameter to be displayed to the user may be user-selectable, or each parameter may be displayed or otherwise conveyed.

In embodiments where the one or more estimated component-specific life states comprise an amount of life remaining, this may be defined via for example a number of bales, a baling time, a volume of material baled, and the like. In various embodiments, the parameter regarding an amount of life remaining may be user-selectable, or each parameter may be displayed or otherwise conveyed.

In one optional branch of the illustrated method 500, life consumption rates may be compared for each of a plurality of different operating conditions (step 560). For example, the controller may be configured to calculate aggregate amounts of life consumed with respect to each of a plurality of different crop types (if more than one crop type is applicable), aggregate amounts of life consumed with respect to each of a plurality of different bale densities, average amounts of life consumed per bale with respect to different crop types and/or bale densities, etc. The comparison may for example be visually demonstrated to a user via a display unit (step 570).

In an embodiment, the controller 410 may compare one or more life consumption estimations as disclosed herein to predetermined baselines or threshold values stored in association therewith. For example, the controller may compare life consumption estimations for recent bales with respect to the life consumption estimations for one or more previous bales having similar or equivalent operating conditions, potentially identifying trends in consumption efficiency or lack thereof. The controller may further compare life consumption estimations for a given baler with respect to those of other balers operating under similar or equivalent operating conditions.

In another optional branch of the illustrated method 500, a life remaining may be predicted for one or more different potential operating conditions of the baler (step 580). Upon identifying or determining a current operating condition of the baler, the method 500 may further include updating a maintenance schedule for the baler and/or one or more affected components, generating an alert, and/or generating an intervention request based on the predicted life remaining for the identified or determined current operating condition (step 590). For example, if the controller determines that a particular type of crop is being (or will be) baled, further in view of historical information regarding the amount of life consumed per bale with respect to this particular type of crop, and still further in view of an expected life of the baler and/or one or more associated components, the controller may further determine that a threshold value or range has been (or will be) violated such that maintenance or other intervention is warranted.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. An agricultural baler, comprising:
   a baling chamber;
   a reciprocating plunger for compressing gathered agricultural material into bales within the baling chamber, the reciprocating plunger being driven by a crank arm, the crank arm being rotated around a crank arm axis by a crank gear;
   a first sensor assembly configured to generate signals relating to forces applied to the reciprocating plunger and one or more baling components configured to at least partially carry forces applied to the plunger; and
   a controller configured to
      automatically determine one or more operating conditions including at least a type of an agricultural material being baled, based at least in part on one or more of detected operating parameters of the baler and a detected geolocation of the baler,
      receive one or more input signals from the first sensor assembly and record at least the corresponding forces applied and the determined one or more operating conditions for a respective bale,
      aggregate data comprising the recorded forces for each bale and respective type of agricultural material baled,
      determine and store baseline or threshold values for the aggregated data respective to the one or more operating conditions,
      compare the aggregated data for a particular bale and/or the baler with the baseline or threshold values having a similar or equivalent one or more operating conditions, and
      generate at least one output signal relating to the aggregated data, further based at least in part on a type of agricultural material to be baled.

2. The agricultural baler of claim 1, wherein the controller is further configured to:
   receive an input signal from a second sensor assembly relating to completion of a bale of said agricultural material, and
   responsive to completion of the bale, to record at least the forces applied in association with the bale, further with respect to the one or more operating conditions of the agricultural material being baled.

3. The agricultural baler of claim 2, wherein the one or more operating conditions associated with the agricultural material being baled further comprise a target bale density and a moisture content.

4. The agricultural baler of claim 1, wherein the controller is further configured to selectively generate an output signal corresponding to a maintenance schedule or intervention request, based on a determined threshold value or range that has been, or will, be violated in view of the aggregated data.

5. The agricultural baler of claim 1, further comprising:
   a graphical user interface linked to the controller and configured to receive user input of at least one of the one or more operating conditions,
   wherein the graphical user interface further receives the output signal from the controller and is configured to generate display indicia on an associated display unit, corresponding to the aggregated data of at least one of the plunger and/or one or more baling components for the at least one of the one or more operating conditions.

6. The agricultural baler of claim 1, wherein the controller is physically mounted in or to the agricultural baler.

7. The agricultural baler of claim 1, wherein the controller is external to the agricultural baler and functionally linked to the first sensor assembly via at least a wireless communications network.

8. A method for monitoring a life state of one or more baling components of an agricultural baler, the baler comprising a baling chamber, a reciprocating plunger for compressing gathered agricultural material into bales within the baling chamber, and one or more baling components configured to at least partially carry forces applied to the plunger, the method comprising:

automatically determine one or more operating conditions including at least a type of an agricultural material being baled, based at least in part on one or more of detected operating parameters of the baler and a detected geolocation of the baler;

determining forces applied to the plunger and at least one associated baling component configured to at least carry forces applied to the reciprocating plunger during operation via a first sensor assembly;

for each of a plurality of bales during operation, aggregating data comprising the determined forces and the respective type of agricultural material baled;

determining and storing baseline or threshold values for the aggregated data respective to the one or more operating conditions;

comparing the aggregated data for a particular bale and/or the baler with the baseline or threshold values having a similar or equivalent one or more operating conditions; and generating at least one output signal relating to the aggregated data, further based at least in part on a type of agricultural material to be baled.

9. The method of claim 8, further comprising:

receiving a signal via a second sensor, said second sensor signal relating to completion of a bale of the agricultural material;

responsive to completion of the bale, recording at least the forces applied in association with the bale, further with respect to the one or more operating conditions associated with the agricultural material being baled.

10. The method of claim 9, further comprising:

selectively generating the output signal corresponding to a maintenance schedule or intervention request, based on a determined threshold value or range that has been, or will, be violated in view of the aggregated data.

11. The method of claim 8, comprising:

receiving user selection of at least one of the one or more operating conditions as an input via a graphical user interface, and responsive to the output signal, generating display indicia on a display unit associated with the user interface, corresponding to the aggregated data of at least one of the plunger and/or one or more baling components for the selected at least one of the one or more operating conditions.

\* \* \* \* \*